(No Model.) 4 Sheets—Sheet 2.
A. M. SHERMAN.
Recording Pressure-Gage.
No. 228,479. Patented June 8, 1880.

Witnesses: Inventor:
Thomas Van Antwerp Allen M. Sherman
Andrew Van Antwerp

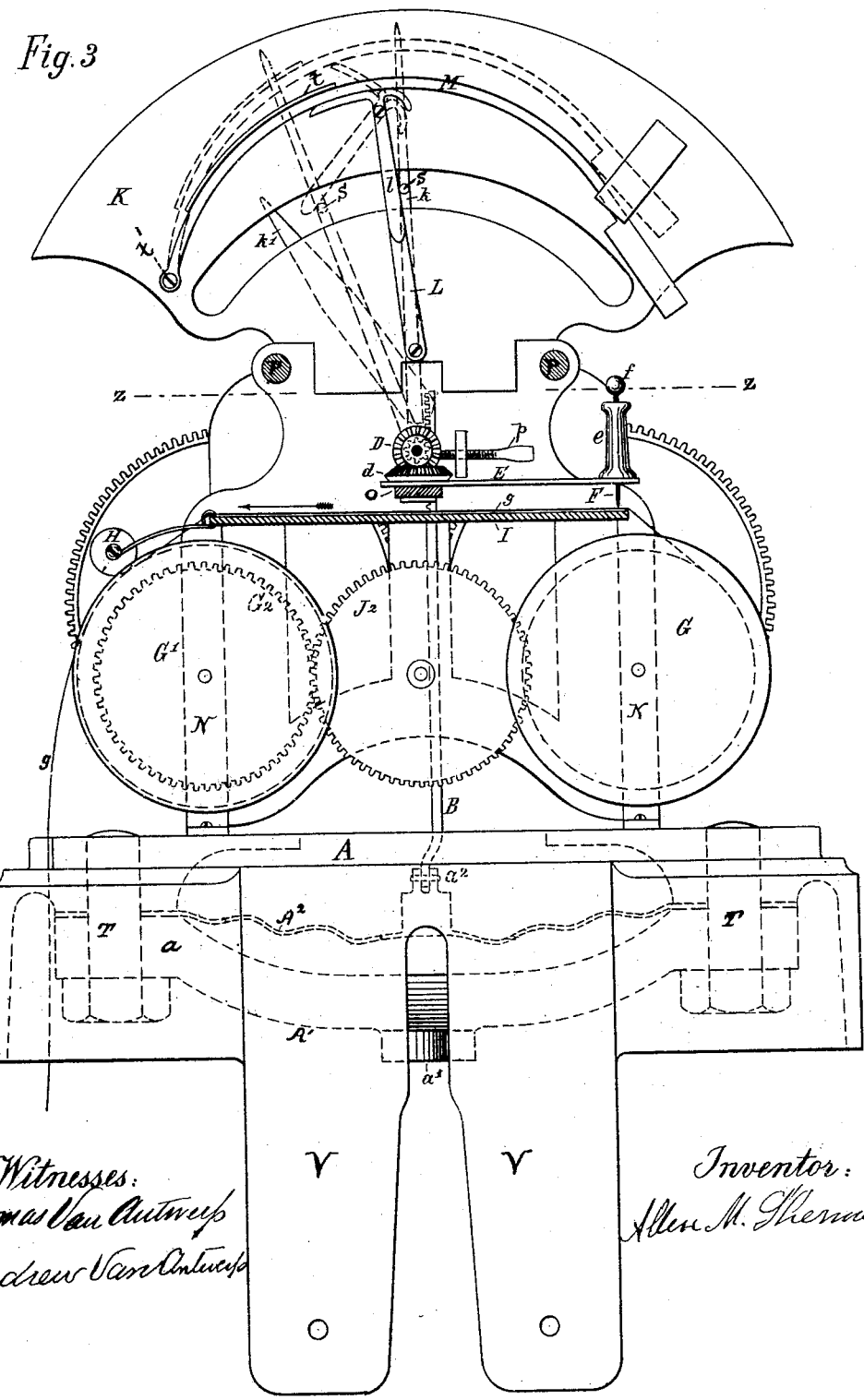

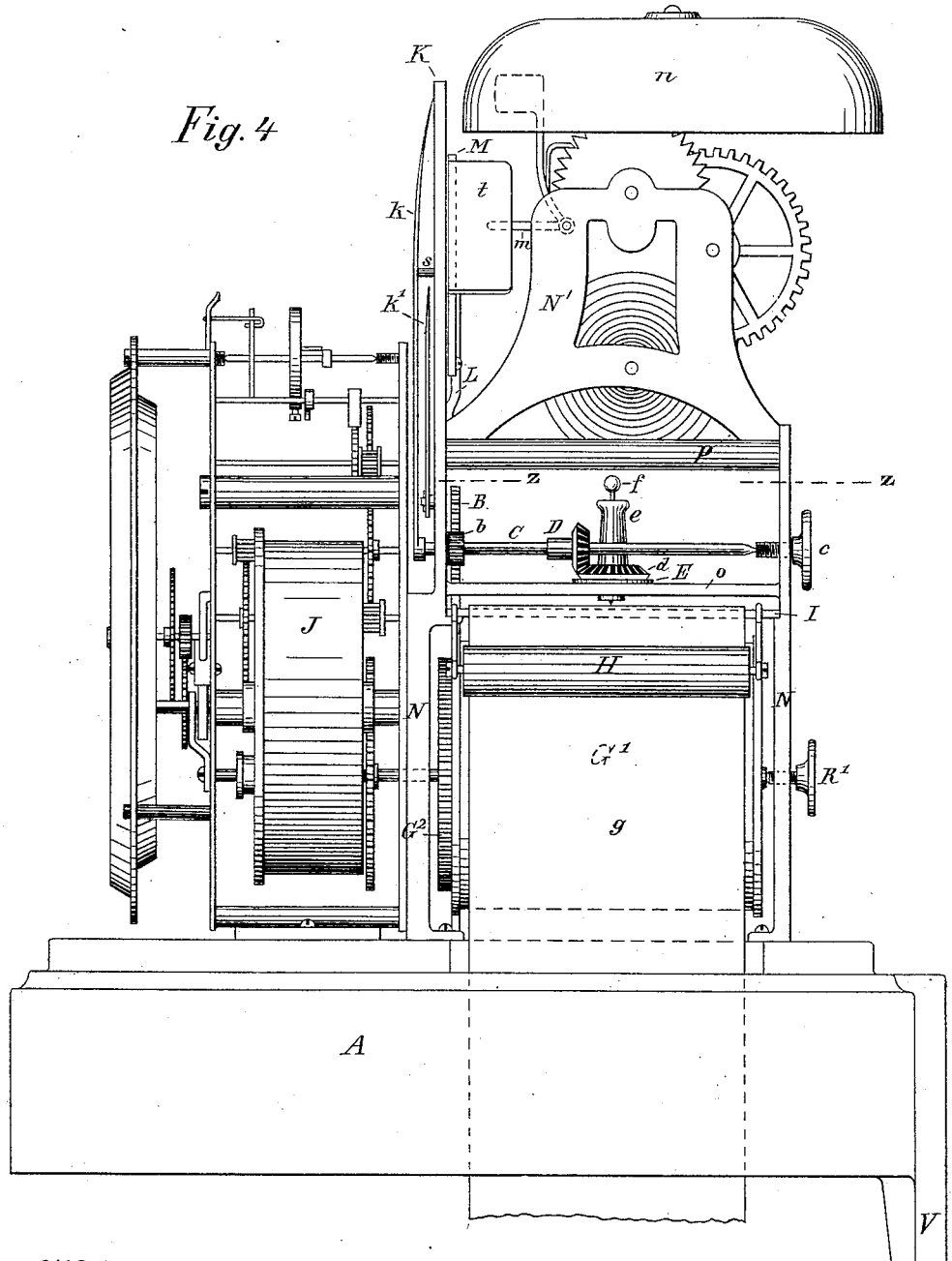

UNITED STATES PATENT OFFICE.

ALLEN M. SHERMAN, OF NEW YORK, N. Y.

RECORDING PRESSURE-GAGE.

SPECIFICATION forming part of Letters Patent No. 228,479, dated June 8, 1880.

Application filed April 8, 1880. (No model.)

*To all whom it may concern:*

Be it known that I, ALLEN M. SHERMAN, of the city, county, and State of New York, have invented certain new and useful Improvements in Pressure-Recording Gages; and I do hereby declare that the following is a full, clear, and exact description thereof, reference being had to the accompanying drawings, forming a part of this specification, in which—

Figure 1:
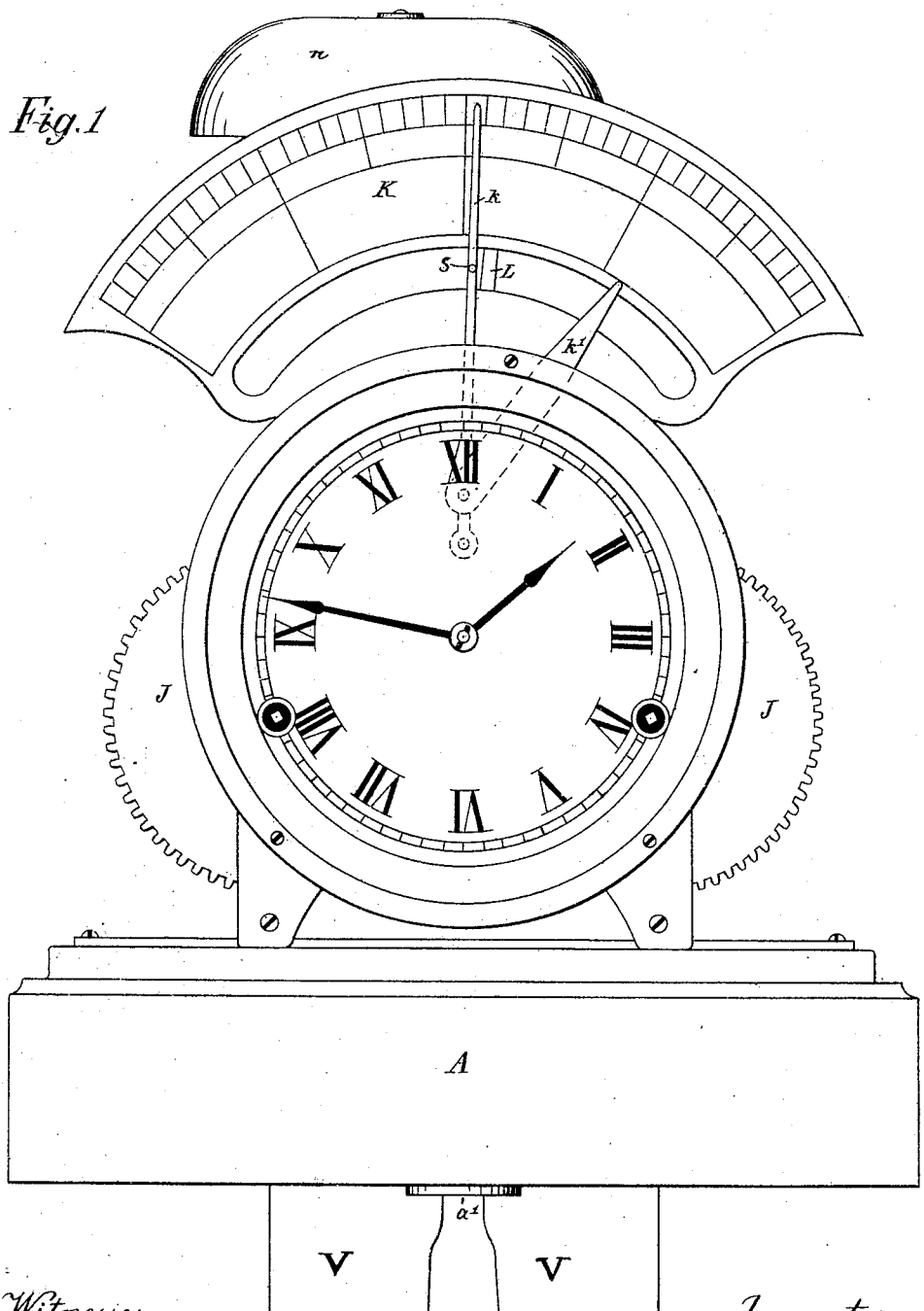
Figure 2:
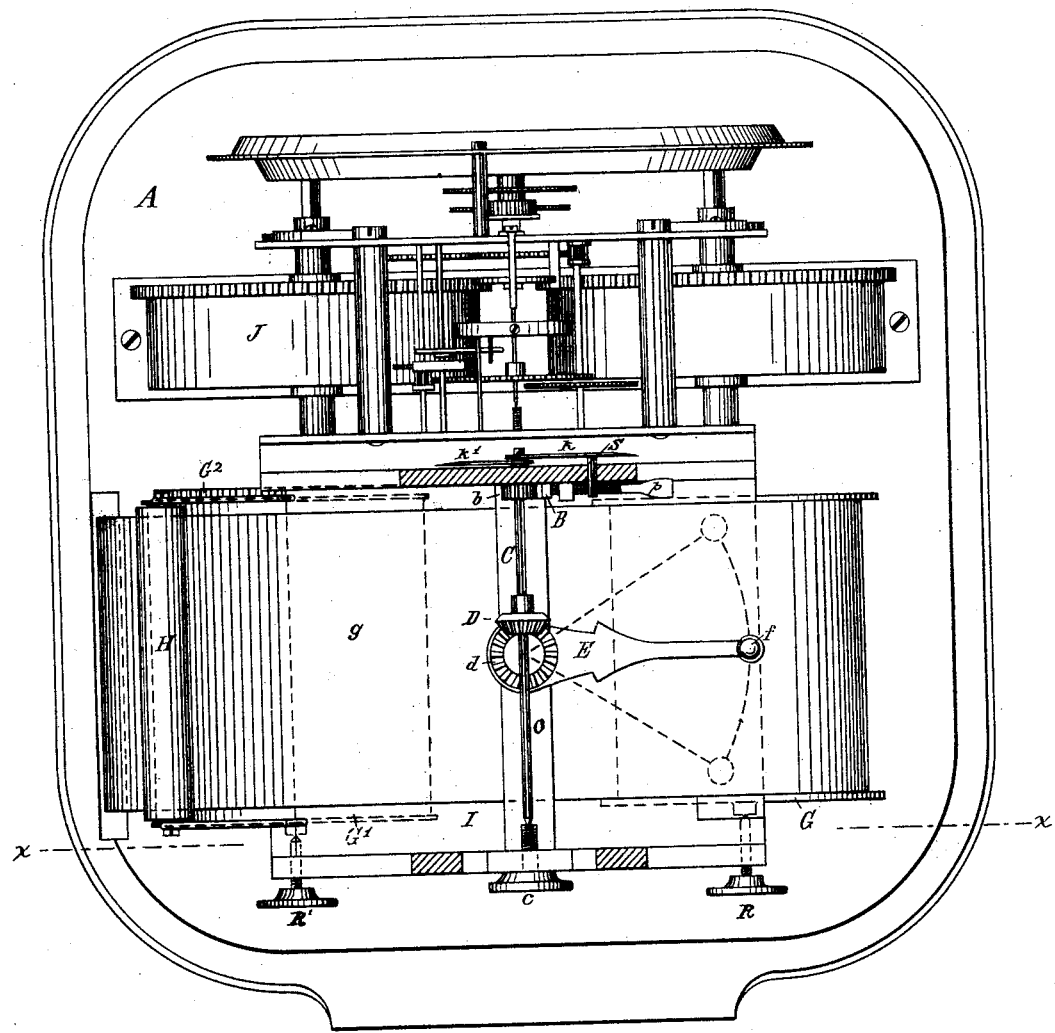

Figure 1 is a front elevation. Fig. 2 is a top view, the portion above the line Z Z, Fig. 3, being removed. Fig. 3 is a rear elevation, partly in section, the portion to the rear of X X, Fig. 2, and the alarm-movement being removed. Fig. 4 is a side view.

Similar letters indicate similar parts in all the figures.

To the under side of the hollow base A (shown in all the figures) is secured, by bolts T T, a chamber, $a$, formed of a rigid saucer-shaped bottom disk, A', and an elastic top plate or diaphragm spring, $A^2$, (shown in Fig. 3,) said bottom disk receiving the pipe which transmits the steam or other fluid in the coupling $a'$, Figs. 1 and 3. Secured to the top of said base is a frame composed of the uprights N N and the transverse rods P P, and secured to these uprights is the table I, over which the ribbon $g$ passes, and just above the table the bar O, Figs. 2, 3, and 4, which supports the bevel-pinion $d$. To the front of the frame the indicator dial-plate K is secured, and in front of the frame the chronometer-movement J is fastened to the top of the base A. On the top of the frame the alarm-movement N', Fig. 3, is secured in any convenient manner.

The rod B, Figs. 2, 3, and 4, is attached at its lower end to the stud $a^2$ on the diaphragm-spring by a pin, and is provided at its upper end with teeth, which mesh into and engage the pinion $b$ on shaft C, the teeth on the rod being adjusted to the pinion by means of the set-screw $p$, operating in a nut secured to the front of the frame. The shaft C passes through and beyond its bearing in the front of the frame, and carries the indicator-hand $k$, as shown in Figs. 2 and 4. Its bearing at its rear end is in a socket in the end of set-screw $c$, operating in a nut in the frame, as shown in Figs. 2 and 4. On this shaft C is fastened the bevel-gear wheel D, which engages the bevel-pinion $d$, the hub of which operates in a perforation in the bar O, Figs. 2, 3, and 4. The arm E is secured to this pinion, and carries at its extremity a crayon-holder $e$, into which the crayon F is inserted.

If desired, a small weight, $f$, may be placed on the crayon, to force it down more firmly on the ribbon $g$ as said ribbon passes from spool G over the table I and drum G' under the roller H, Figs. 2, 3, and 4.

The spool G and drum G' are provided with shafts which revolve in bearings, one end of each shaft entering its respective bearing in the front of the frame N, the other extremity being socketed to receive the end of its respective set-screw in the rear of the frame, as shown at R R', Figs. 2 and 4.

The spool G is formed of two circular disks, the front one permanently secured to the shaft. The rear one has a screw-thread tapped through its center. The rear end of the shaft having a corresponding thread, a sleeve or tube upon which the ribbon has been previously wound may be slipped on the shaft, the disk screwed thereon, and the spool adjusted in its bearings rapidly and conveniently, as before described.

The drum G' is a light hollow metal cylinder, having a ridge or flange at each end for the guidance of the ribbon. The surface is either serrated or made rough by a jacket of emery-cloth or other like device, so that when the weighted roller H forces the ribbon in close contact with the surface of the drum said ribbon will be drawn from the spool G over the table I and under the crayon F, when said drum is revolved by the action of the chronometer-movement J. The arbor of the chronometer-movement passes through the front of the frame N, and at its extremity carries the gear-wheel $J^2$, which engages the gear-wheel $G^2$, rigidly secured to the front end of the drum G'. (See Figs. 2, 3, and 4.)

The setting-arm L is secured at its lower end by a pivot to the rear of the indicator dial-plate K. At its upper end, and between it and the dial-plate, the T-shaped tripping-lever $l$ is pivoted, on the head of which rests the curvilinear arm M, pivoted at $t'$, Fig. 3.

The projection $t$ on arm M (shown in Figs. 3 and 4) rests on and confines the trip $m$ of the alarm-movement, so that when arm M is raised by the head of lever *l*, when operated on by pin S on the indicator-hand *k* (said pin moving in and protruding through the slot shown in the indicator-plate) moving the pendent limb of said lever, the alarm-trip *m* will be released and the alarm sounded. (See Figs. 2, 3, and 4.)

The setting-arm L, carrying said tripping-lever *l*, may be at any time adjusted so that pin S on hand *k* will engage pendent limb of lever *l* at any point on the indicator-dial desired by moving it over on its pinion until the pendant of the lever *l*, as seen through the slot, coincides with that point. A tell-tale hand, *k'*, on said dial is provided, operated upon by the pin S on hand *k* only, its object being to expose at a glance the extreme pressure that has been indicated by hand *k* since it had been last set against the pin S on said hand.

The chronometer-movement is provided with the ordinary clock-dial, hour and minute hands, thus combining an accurate time-piece with the gage. At the rear of the base A, and forming part of it, is the bifurcated wall-plate V, the whole forming a bracket. A large headed bolt or screw being fixed in the desired location, the plate V is adjusted on it, and is then further secured by the insertion of two small nails or screws through the perforations in the lower part of the plate.

The pipe transmitting the steam or other fluid to the chamber *a* having been connected with the coupling *a'*, Figs. 1 and 3, any movement of the spring $A^2$ causes the rod B to respond, and the teeth on rod B actuating the pinion *b* turn the shaft C, and with it the bevel-gear wheel D, which operates the bevel-pinion *d*, and causes the arm E, attached to said pinion, to move the crayon F in crayon-holder *e* transversely over the ribbon, Figs. 2, 3, and 4. As this ribbon is moved continuously over the table I through the operation of the chronometer-movement on the drum G', the result is that when the pressure does not vary the diaphragm-spring is at rest, the arm E is stationary, and a straight longitudinal mark will be shown on the ribbon, while the relative degree of movement of the spring and the crayon-bearing arm E is such (the first being augmented by the relative proportions of the different parts of the mechanism) that the slightest and almost imperceptible variation in the travel of the spring $A^2$ will be readily detected on the indicator-dial K, and plainly recorded and easily discerned on the recording-ribbon. The speed of the drum being known, the precise moment that any point of the ribbon had passed under the crayon is readily discovered. If desired, transverse rectilinear lines may be ruled on the ribbon, adapted to the speed of the drum, graduated to any periods of time. A rabbet is formed around the top edge of the base to receive a glass shield or cover for the protection of the instrument. A slot or opening is provided, also, through which the ribbon passes after leaving the drum, as shown in Figs. 2, 3, and 4, and thence into any receptacle convenient for inspection.

Having thus described my invention, what I claim, and desire to secure by Letters Patent, is—

1. The rod B, pinion *b*, shaft C, gear-wheels D *d*, arm E, and crayon-carrier *e*, all combined, substantially as and for the purpose set forth.

2. The shaft C, hand *k*, pin S, lever *l*, arm M, and alarm-trip *m*, all combined substantially as and for the purpose set forth.

3. The setting-arm L, lever *l*, arm M, hand *k*, and pin S, all combined substantially as and for the purpose set forth.

ALLEN M. SHERMAN.

Witnesses:
THOMAS VAN ANTWERP,
ANDREW VAN ANTWERP.